July 5, 1932.  W. J. MILLER  1,866,506
APPARATUS FOR FORMING ARTICLES OF GLASS
Filed Jan. 5, 1920   7 Sheets-Sheet 1

July 5, 1932.  W. J. MILLER  1,866,506
APPARATUS FOR FORMING ARTICLES OF GLASS
Filed Jan. 5, 1920  7 Sheets-Sheet 3

Witness
T. F. Dilworth

Inventor
William J. Miller.
by Edward A. Lawrence,
his attorney

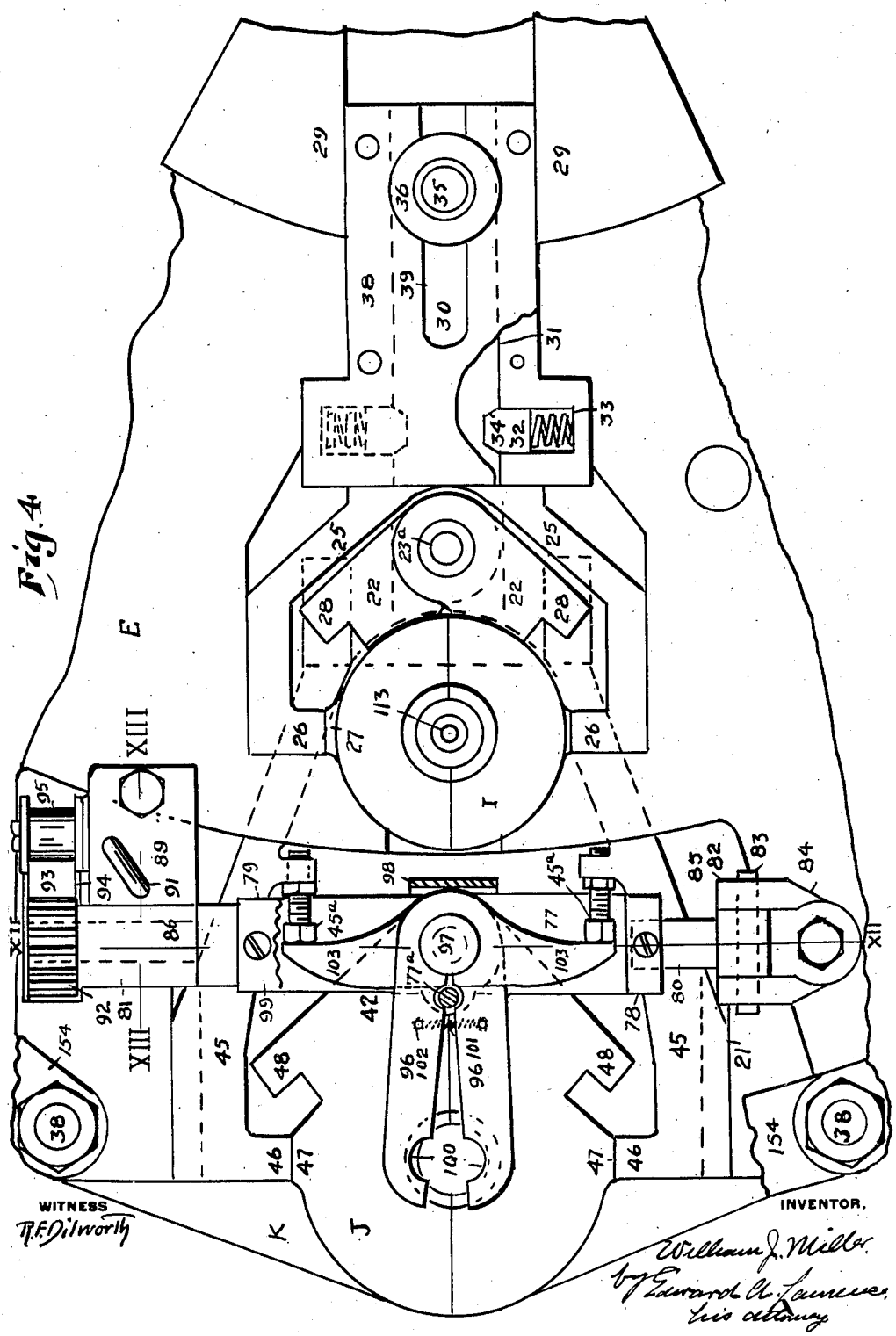

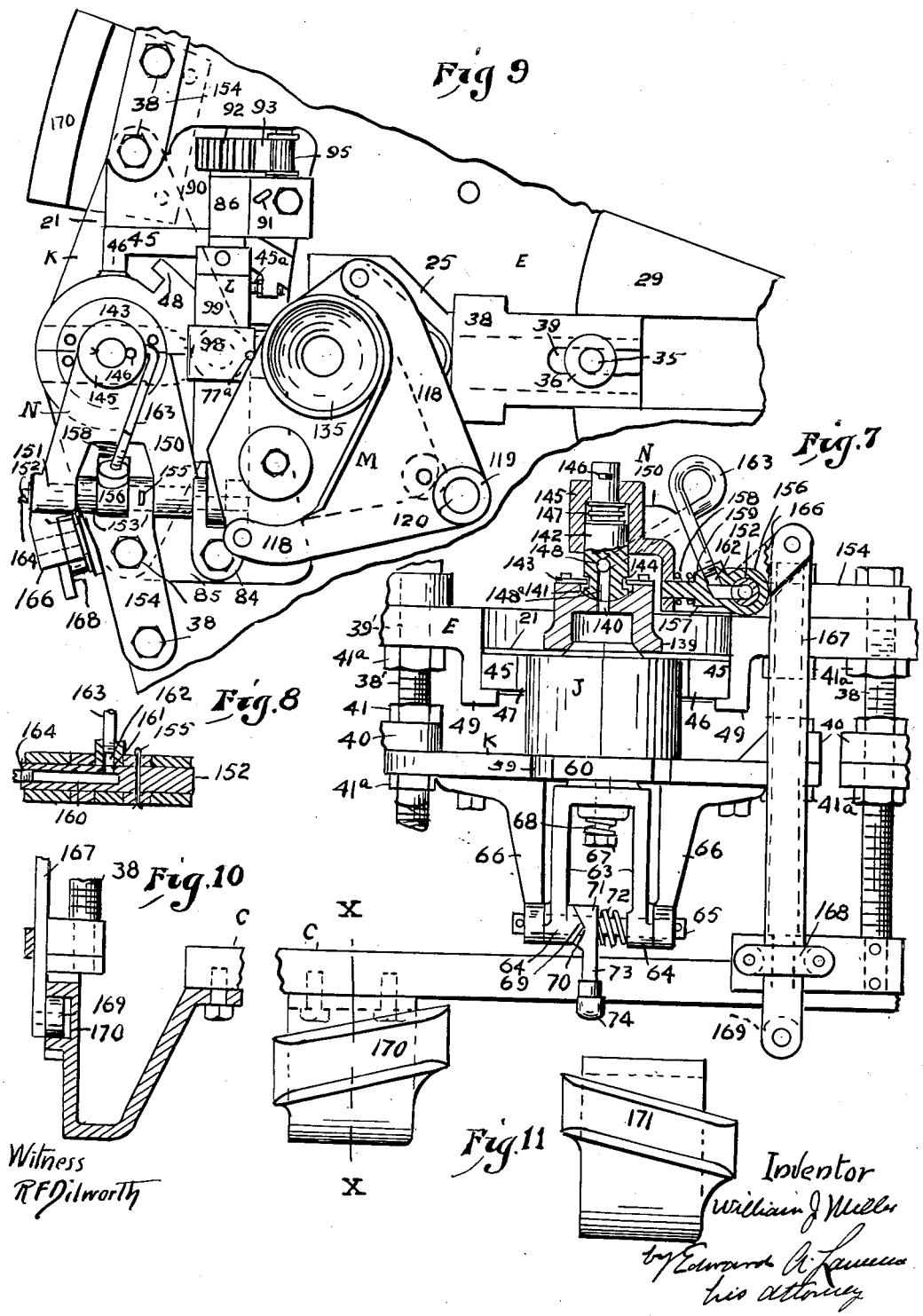

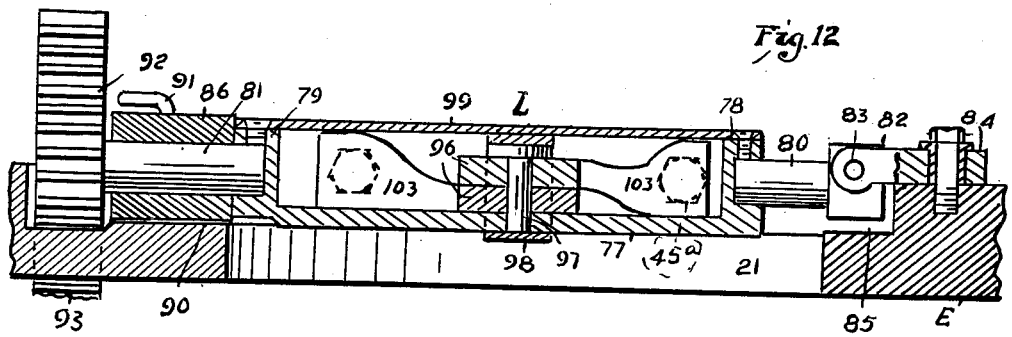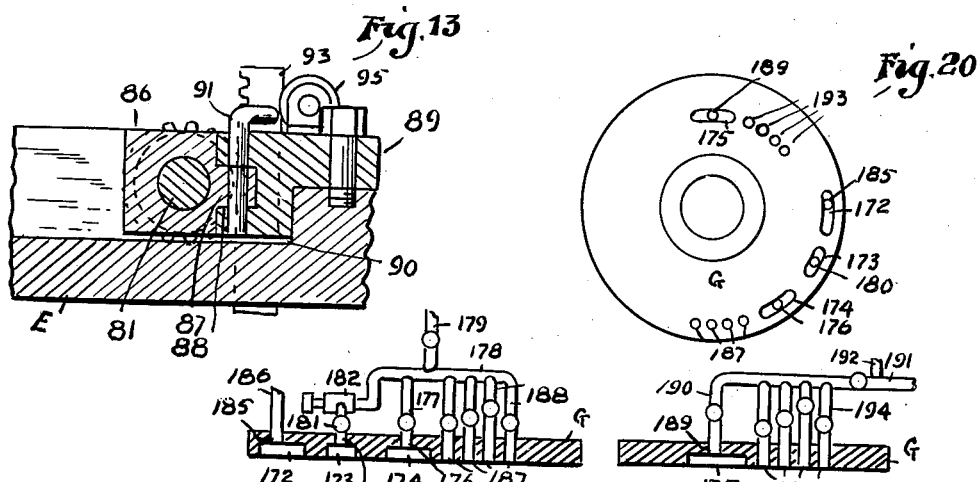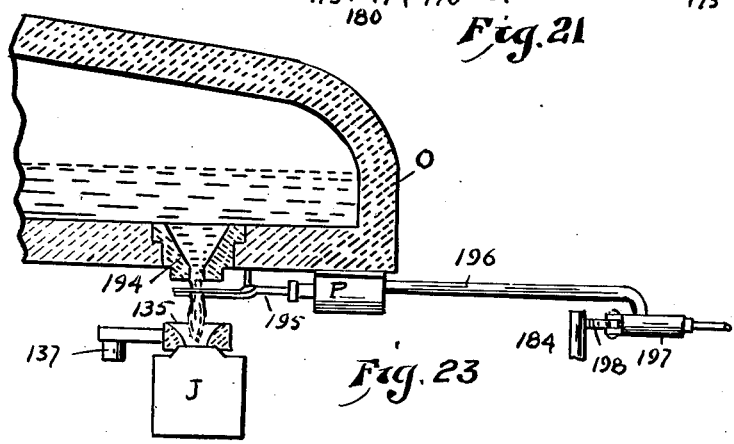

July 5, 1932. W. J. MILLER 1,866,506
APPARATUS FOR FORMING ARTICLES OF GLASS
Filed Jan. 5, 1920 7 Sheets-Sheet 7
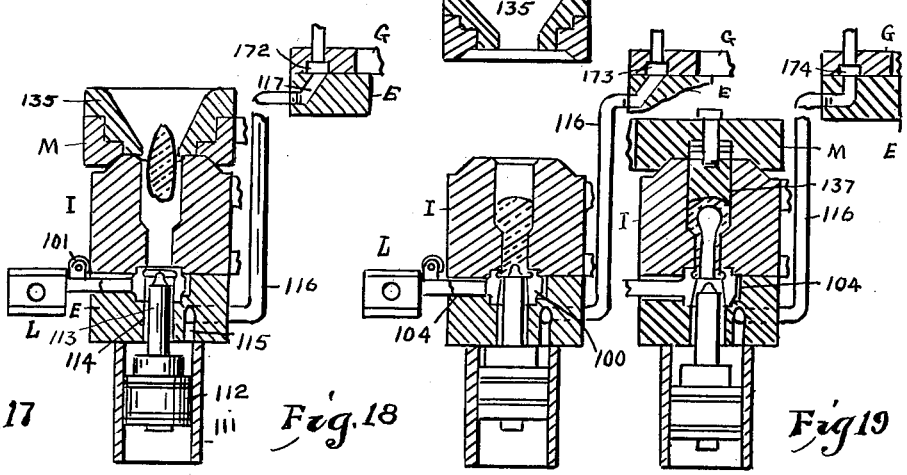
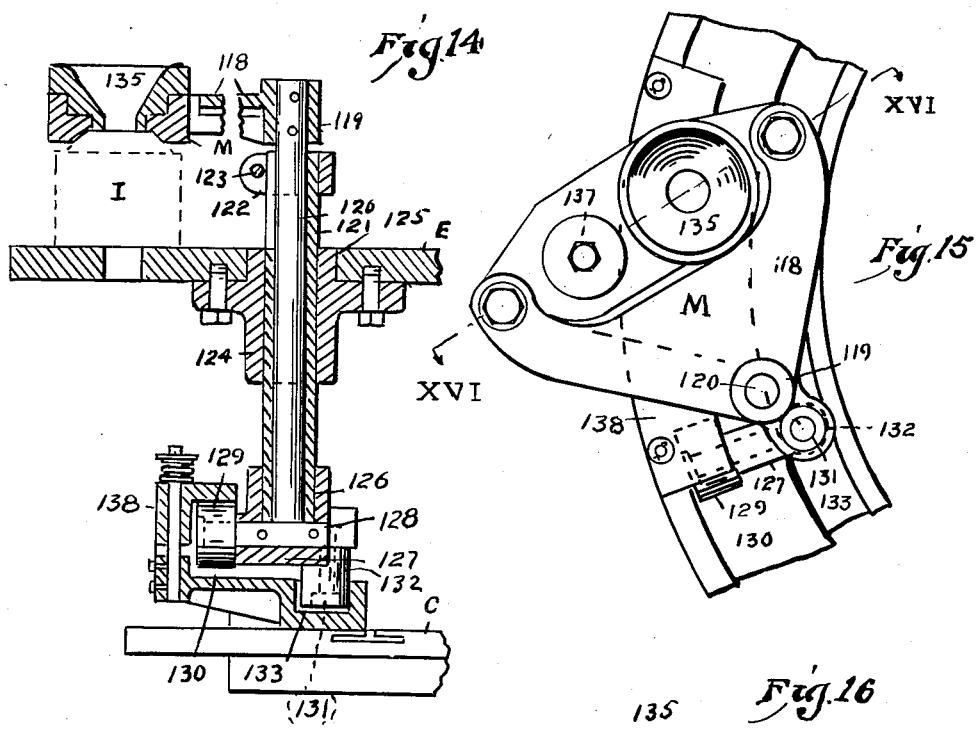

Patented July 5, 1932

1,866,506

UNITED STATES PATENT OFFICE

WILLIAM J. MILLER, OF SWISSVALE, PENNSYLVANIA, ASSIGNOR TO HAZEL-ATLAS GLASS CO., OF WHEELING, WEST VIRGINIA, A CORPORATION OF WEST VIRGINIA

APPARATUS FOR FORMING ARTICLES OF GLASS

Application filed January 5, 1920. Serial No. 349,445.

My invention consists of new and useful improvements in automatic machines for blowing or otherwise forming articles of glass.

The object I have in view is the provision of a high speed machine capable of turning out perfect ware in large quantities.

More particularly it comprises a machine provided with a plurality of pairs of associated blank molds and blow or other finishing molds of the partible type mounted on a support rotated preferably at constant speed. Novel means are provided for depositing the gathers of glass in the blank molds in turn; for filling the neck ring; for forming the blanks in the blank molds; for transferring the blanks carried by the neck rings to the corresponding finishing molds and depositing them therein; for finishing the blanks in the finishing molds, and for discharging the finished articles from the finishing molds.

New and improved means are provided for opening and closing the molds.

New and improved means are provided for feeding the glass to the blank molds and for compacting the glass therein.

Many other novel features of construction, arrangement, and operation of parts and mechanisms will appear from the following description.

Figure 1:
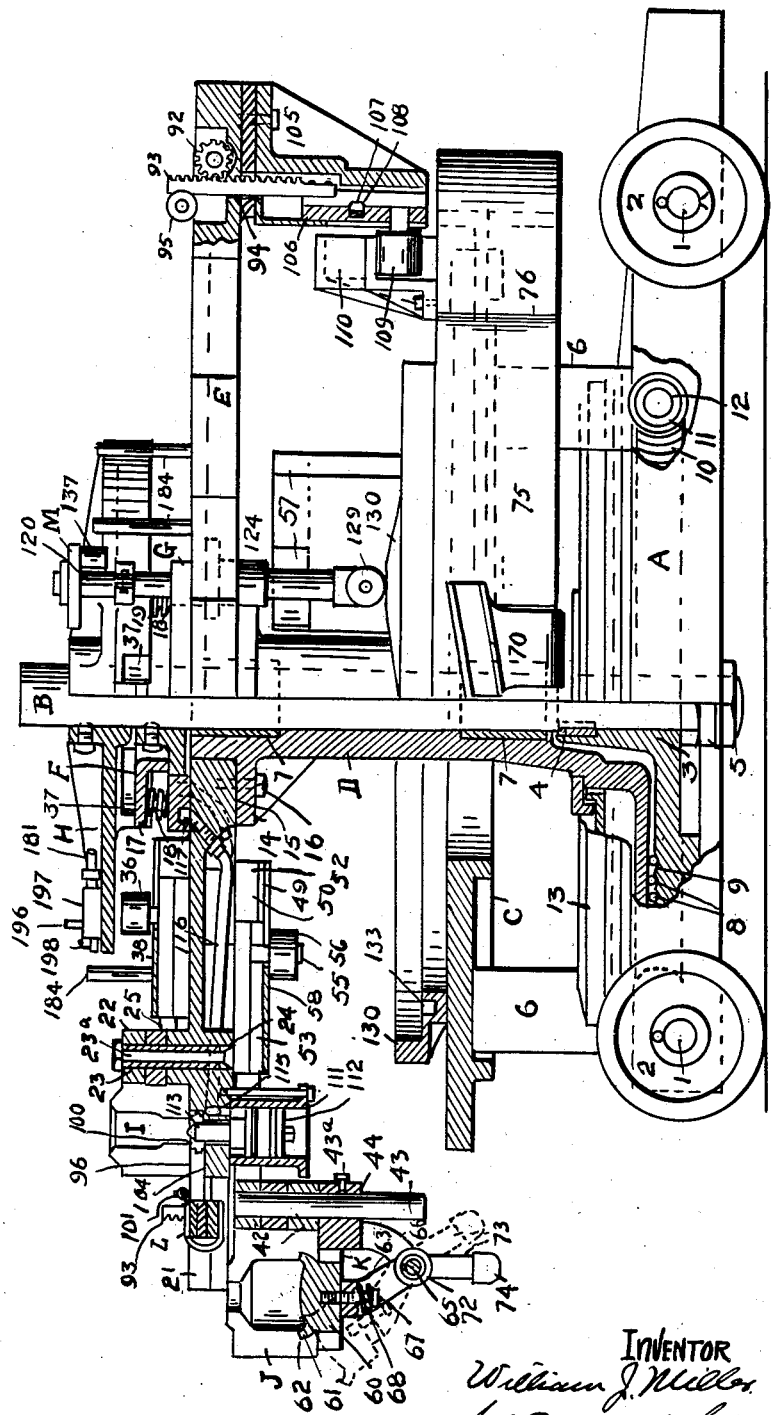
Figure 2:
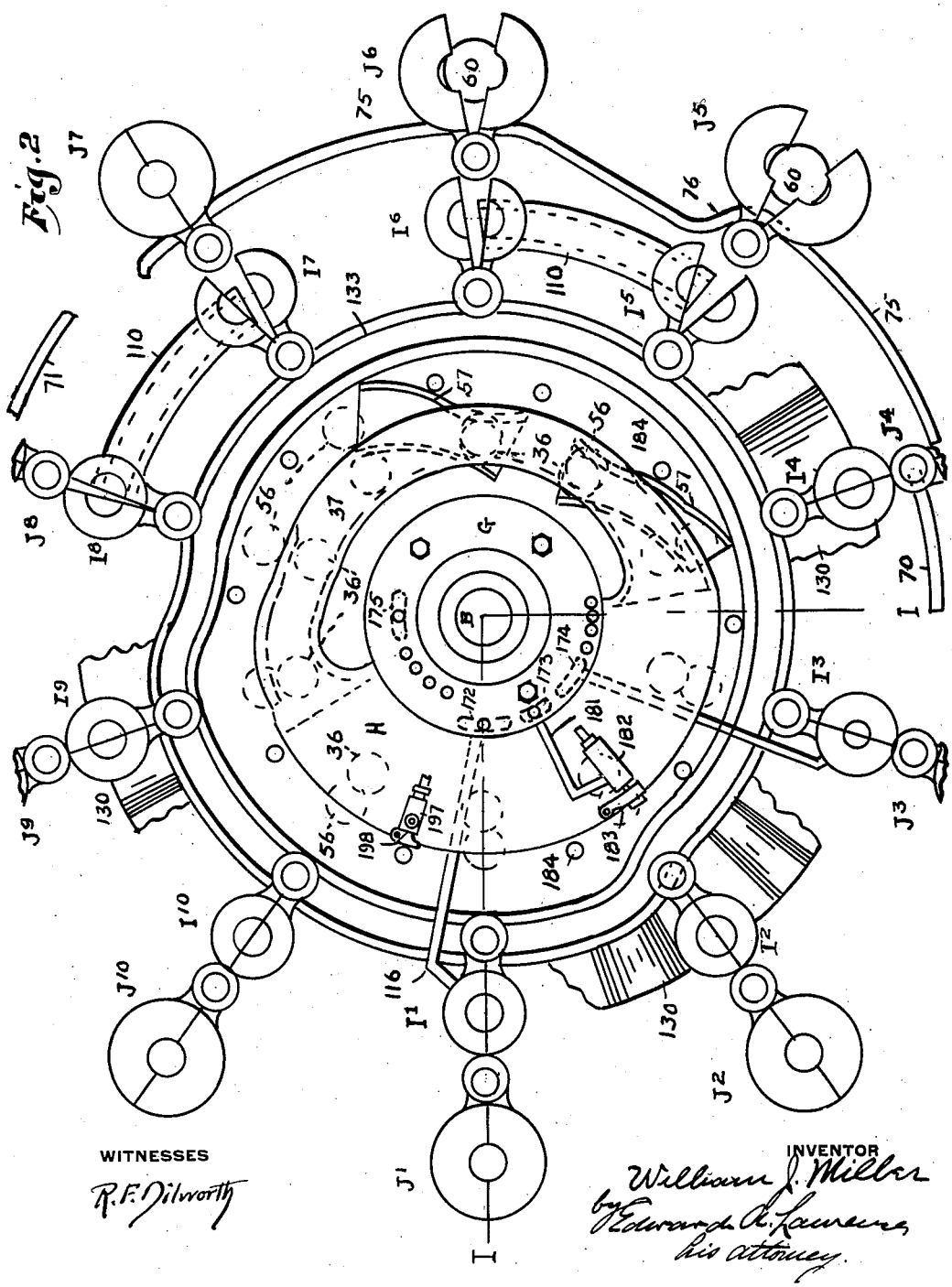
Figure 3:
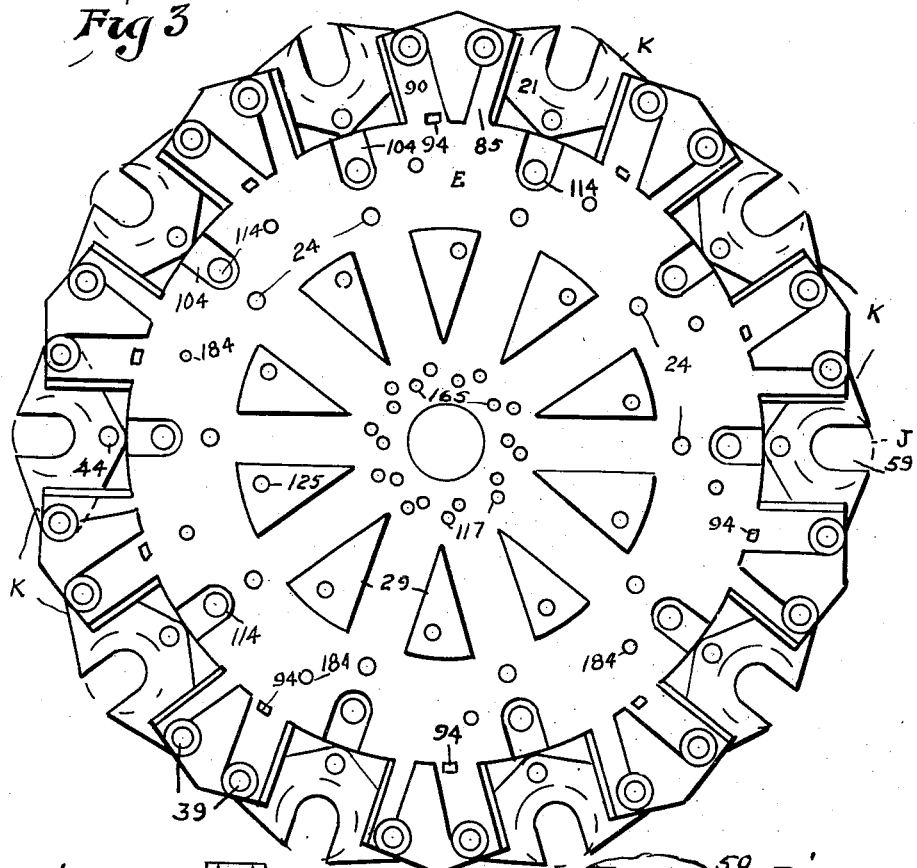
Figure 5:
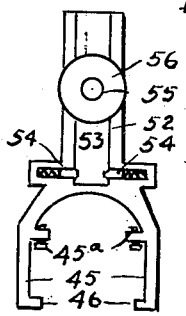
Figure 6:
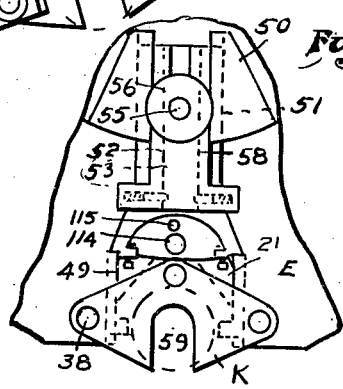

In the accompanying drawings, which are, however, merely intended to illustrate the principles of my invention without limiting the scope of the same to the structure shown, Fig. 1 is a side elevation of the machine partially in section on the line I—I in Fig. 2, certain parts being omitted for the sake of clearness; Fig. 2 is a diagrammatic view in plan; Fig. 3 is a plan view of the mold table; Fig. 4 is an assembly of a pair of molds; Fig. 5 is a detail showing one of the blow mold operating yokes; Fig. 6 is a broken plan view of the mold table showing one of the blow mold yokes, and its mounting; Fig. 7 is an enlarged elevation, partly broken away in section, showing a blow mold, its blow head and other associated parts; Fig. 8 is a longitudinal section through the pivot shaft of the blow head; Fig. 9 is an assembly in plan showing an assembly of a blow mold, a blank mold, the transfer, the blank mold cover plate and the blow head; Fig. 10 is a section taken along the line X—X in Fig. 7; Fig. 11 is a side elevation of the cam track which retreats the blow heads from their blowing positions; Fig. 12 is a sectional view of one of the transfers taken along the line XII—XII in Fig. 4; Fig. 13 is a sectional view taken along the line XIII—XIII in Fig. 4; Fig. 14 is a view in vertical section showing one of the cover plates and its associated mechanism; Fig. 15 is a top plan view of the same; Fig. 16 is a sectional view along the line XVI—XVI in Fig. 15; Fig. 17 is a view in vertical section showing the funnel seated on the blank mold and the gather of molten glass dropped therein, suction being applied to the bottom of the blank mold to fill the neck ring; Fig. 18 is a similar view showing the funnel elevated and the glass compacted in the blank mold and neck ring; Fig. 19 is a similar view showing the upper end of the blank mold plugged and the blank blown in said mold; Fig. 20 is an inverted plan view of the chamber block; Fig. 21 is an extended section of said block showing diagrammatically the blank mold chambers; Fig. 22 is a similar view showing the blow mold chambers, and Fig. 23 is a diagrammatic view showing the feed.

The base of the machine consists of a chassis having a bed A, axles 1 and wheels 2. B is a column having its lower end fixed in socket 3 of the chassis by means of key 4 and lock nuts 5 are screwed up against the bed A on the lower end of column B.

C is an annular platform supported by legs 6 on the chassis and concentric with column B. Platform C carries the cam tracks for opening and closing the blow molds, for shifting the blow heads, for operating the mold bottoms, and for operating the transfers.

D is a sleeve rotatably mounted on column B, 7 indicating bronze bushings interposed between the same. The foot of the sleeve is flared into annular form and is supported on ball bearings 8 running in raceways 9 on the chassis. The perimetral edge of the foot of sleeve D is provided with an annular worm gear 10 meshing with worm 11 on the shaft 12 journaled on the chassis and driven by an electric motor or some other prime mover, not shown. 13 is an annular cover plate for the foot of sleeve D.

14 is a shoulder, circumferential of the upper portion of sleeve D, upon which rests the hub 15 of the mold table E which fits down over the upper end of the sleeve D and is fixed thereto, as by bolts 16.

F is a ring member bolted to column B above the sleeve D and provided with a horizontal top flange 17 pierced at regular intervals with vertical holes to receive the upper ends of pins 18 extending up from an annular block G which fits around the ring F, springs 19 being coiled about the pins 18 to hold said block in snug contact with the table E, the surfaces of both the block and the table being finished to make a close contact as near air-tight as practicable.

H is a cam support of spider form bolted to the column B above the ring F. This support has on its under surface the cam tracks for opening and closing the blank molds, and also carries the valves which operate the shear mechanism and control the air puff for the blank molds.

It is apparent that table E rotates at constant speed in the case of the machine shown counterclockwise, while the column B, platform C, ring F, block G and support H are stationary.

The mold table E, shown in plan in Fig. 3 is circular in form with its perimeter indented at regular intervals with recesses 21 equal in number to the blow molds. In the machine shown ten blow molds and ten blank molds are provided, the blank being transferred from the blank mold to the associated blow mold to be blown to finished form. The molds are of hinged or partible type.

I will first describe the mechanism for opening and closing the blank molds, and then the mechanism for opening and closing the blow molds.

The blank molds are indicated by the general letter "I" and the blow molds by "J".

The blank mold parts are provided with hinge arms 22 which are pivoted together by the hollow pintle 23 whose lower end is split and seated in hole 24 in table E. A bolt 23ª, having a tapered head to engage and spread the split end of said pintle, extends up through the bore of the pintle to receive a nut screwed down against the upper end of the pintle. Thus the pintle can be raised or lowered in seat 24 to suit varying heights of blank molds.

25 is a sliding yoke member having its outer end bifurcated and provided with inwardly extending squared bosses 26 which, as the yoke is extended engage the sides of the mold parts and force the same together, and, when the mold is closed, lock the latter shut by engaging the squared projections 27 on the mold parts. As the yoke member 25 is retracted toward the axis of table E said bosses 26 engage angular projections 28 on the hinge arms 22 and open the mold.

29 are guide blocks integral with or attached to the table and between which slide the stems of the yoke members 25. 30 is a block, slidably mounted in a longitudinal groove 31 on the top surface of the stem of the yoke member, and normally held fixed in relation to said yoke member by means of spring actuated dogs 32 mounted in seats 33 in said yoke member, and engaging notches 34 in the sides of the block 30. 35 is a pin extending upwardly from block 30 and 36 is a roller journaled on said pin and adapted to be engaged by the channel track 37 on the under side of support H. 38 is a cover plate attached to the yoke member to hold the block 30 and spring dogs 32 in place. Said cover is provided with a longitudinal slot 39 to provide clearance for the pin 35.

It is evident that in obedience to the eccentricity of the cam track 37 the yoke members of the blank molds will be moved in and out, radially of the table E, thus opening and closing the blank molds at the proper times. In case a mold abnormally resists opening or closing, owing to jamming or some disarrangement of its mechanism, the spring dogs will be disengaged from the block and thus breakage will be avoided.

K indicates the mold plates upon each of which is mounted one of the blow molds J, one of said plates being secured below each of the recesses 21 of the table E. 38' are bolts depending through holes 39' in said table, and extending through sleeve bearings 40 of the mold plate K. 41 are lock nuts screwed on said bolts against the ends of the sleeves 40 to hold the plate K rigid at the desired elevation to suit the height of the type of blow mold in use. The plates K may thus be raised or lowered to the desired height. 41ª are lock nuts screwed on bolts 38 up against the under face of the mold table to hold the bolts rigid.

The parts of each blow mold are provided with hinge arms 42 pivoted together by a pintle shaft 43 which has its lower end fixed in socket hole 44 in plate K as by a set screw 43ª, thus permitting the pintles to be raised or lowered to suit the height of the mold in use.

The mechanism for opening and closing the blow molds is similar to that used for the blank molds except that the former is mounted on the underside of the table E.

Thus 45 is a yoke member shown in Figs. 1, 5 and 6 having its outer end bifurcated and provided with inwardly extending squared bosses 46 which as the yoke is forced outwardly, relative to the table E, close the mold and by engagement with the squared projections 47 on the mold parts lock the mold closed. As the yoke member is moved inwardly of the table E, said bosses engage projections 48 on the mold hinges 42 and open the mold.

The sides of the recesses 21 are provided with depending L-shaped slideways 49 to support the front ends of the yokes 45 in proper alinement, while the stems of the yokes 45 move between guide blocks 50 secured to the under side of the table E, and provided with lateral horizontal flanges 51 which engage undercut portions on the sides of the stem, thus holding the inner ends of the yokes 45 in proper alinement. The stems of said yokes are provided on their undersides with longitudinal grooves 52 in which are mounted the blocks 53 normally held rigid with the yokes 45 by means of spring dogs 54, mounted in seats in said stems, and engaging the notches in the sides of said blocks 53. 55 is a pin depending from the block 53 and provided with a roller 56 which engages in turn the two channel tracks 57 mounted on the platform C. The under face of the yoke stems are provided with cover plates 58 holding the blocks 53 and spring dogs 54 in place, said plates being longitudinally slotted to provide clearance for the pins 55.

Thus in obedience to the eccentricity of the tracks 57 the blow molds will be opened and closed as the table E revolves, and in case a mold abnormally resists movement, the spring dogs 54 will be disengaged from the block 53, thus avoiding breakage.

I will next describe the blow mold bottoms.

The plates K are recessed as at 59 to provide clearance for the swingingly mounted blow mold bottoms 60 which are provided with upwardly flaring circumferential lips 61 which are adapted to seat in the complemental grooves 62 in the interior walls of the mold parts as the molds close about their bottoms.

Said mold bottoms 60 are each mounted on the top cross bar of a frame 63 whose depending legs are provided with hubs 64 journaled on a shaft 65 connecting the lower ends of the brackets 66 depending from the plate K on either side of the recess 59. 67 is a headed bolt extending up through an unthreaded hole in the top bar of the frame 63 and screwed into a threaded hole in the axis of the mold bottom. 68 is a helical spring coiled about said bolt between its head and the top bar of the frame 63. This form of attachment enables me to change the mold bottom to suit the character of blow mold used, and also renders the mounting of the mold bottom sufficiently flexible to enable the bottom to be properly seated in the closing mold, the flare of the lips 61 assisting in positioning the mold bottom in the mold as it closes.

One of the hubs 64 has its inner end provided with a male clutch face 69 which is adapted to engage the complement female clutch face 70 on the end of a hub 71 journaled on shaft 65 and held in resilient engagement with the end of said hub 64 by a helical spring 72 mounted on shaft 65.

73 is a depending arm rigidly connected to the hub 71 and provided on its lower end with a tapered roller 74 which is adapted to engage a cam track 75 mounted on the platform C. The layout of said cam track is shown in Figs. 1 and 2 and it will be noticed that its major extent is concentric with the axis of the machine but at one intermediate zone, the track is retracted toward said axis as at 76. Thus when the molds J are in turn opened, the mold bottoms are at first held in position by the contact of their rollers 74 with the uniform portion of the cam track 75 but when said rollers move into contact with the retracted portion 76 of said track, then the support of said mold bottoms is relieved and said bottoms swing outwardly to discharge the blown ware. As the roller travels out of said portion 76 of said track, into engagement with the rear portion 75 of the cam track, the mold bottoms are again raised into position before the molds close. The track 75 need not be extended clear around the machine as the closed mold holds its bottom in place and the cam track need only be extended enough to raise the bottom before the mold closes. By setting the axis of rotation, here the shaft 65, inwardly toward the axis of the machine, as shown in Fig. 1 gravity promptly dumps the mold bottom when its roller reaches the portion 76 of the cam track 75. In case the mold bottom abnormally resists closing, owing to jamming or some other accidental cause, then the resilient engagement between the clutch faces 69 and 70, will slip and breakage will be avoided.

It will be noticed that the front end or entrance of the portion 76 of the cam track 75 is more abrupt than the rear end or exit of the same, causing the bottom to drop quickly, thus insuring the discharge of the blown ware.

I will next describe the blank transfer mechanism.

For the purpose of transferring the blank from the blank mold to the corresponding blow mold, I provide each pair of molds with a transfer device L which is shown as of the following construction.

77 is a narrow plate having at its ends rectangular brackets 78 and 79 which are axially socketed to receive the inner ends of trunnions 80 and 81, respectively. The trunnion 80 is journaled in a block 82 which is pivoted eccentrically as by bolt 83 in the forks of a bifurcated bracket 84 bolted to the table E on one side of the recess 21, the bracket 84 overhanging a depression 85 bordering the side of said recess. The other trunnion 81 is reduced and journaled in a bearing block 86 which is provided with a horizontal lip 87 fitting in a corresponding slot 88 in a bracket 89 bolted to the table E on the other side of the recess 21 and overhanging a depression 90 bordering the side of said aperture 21. A removable pin 91 engaging registering holes in the lip 87 of block 86 and in the bracket 89 to detachably hold said bearing block in place.

It is evident that by removing the pin 91 and unbolting the bracket 89, the plate 77 and its associated mechanism may be turned up over out of the way on the bolt 83 as an axis, thus giving access for repairs, adjustments, etc. The extreme end of the trunnion shaft 81 is provided with a rigidly mounted gear 92 which is in mesh with a sliding rack 93 extending up through a rectangular hole 94 in the table E. Means, later to be described, are provided for moving said rack longitudinally, up and down, thereby reversing the plate 77.

95 is a roller, mounted on a spur shaft extending from the side of bracket 89, and bearing against the back of said rack to keep the same in proper alinement.

96 represents a pair of arms having their butts pivoted together to the center of the plate 77 by a pin 97, a U-shape spring clip 98 being provided to hold the arms snugly in contact with each other and with the plate 77. 99 is a cover plate spanning the space between the brackets 78 and 79.

The outer ends of said arms 96 are in the form of complemental neck ring halves 100, and said arms are normally held in position to complete the neck ring by means of a helical spring 101 whose ends are attached to studs 102 on said arms. Each arm is provided at its base with angular extension 103. The table E is provided with a depression 104, of the same depth, as the depressions 85 and 90 and extending inwardly from the recess 21 to the station of the adjacent blank mold I, so that when the transfer device is turned into the position shown in Fig. 1, it occupies said recess and the blank mold closes over the neck ring which is in axial alinement with the mold cavity. When the blank mold is opened and the transfer device is reversed into the position shown in Fig. 4, the neck ring is positioned over the mouth of the blow mold J, and as the yoke 45 completes its outward movement to close the blow mold, adjustable contact bolts 45$^a$ carried by said yoke engage the extensions 103 of the arms 96, forcing the neck ring open against the action of the spring 101, thus dropping the blank suspended from the neck ring into the blow mold.

The neck ring is then reversed into its former position under the blank mold which again closes over it, the spring 101 having closed the neck ring as soon as it rises from the blow mold.

The plate 77 carries a vertical pin 77$^a$ which acts as a centering device for the two arms 96 as they are closed together.

The rack 93 depends through the hole 94 in the table E. 105 is a vertical guide box bolted to the underside of the table E in which works a two part slide 106 reciprocable in a vertical plane, to one part of which the lower end of rack 93 is bolted. 107 is a spring dog mounted in a horizontal seat in one part of the two part slide 106 and extended therefrom into engagement with a notch 108 in the other part of said slide, thereby normally connecting said rack and slide together so that they move in unison. 109 is a roller mounted on the side of the slide 105 near its lower end and engaging one of two hooded cam tracks 110 mounted on the platform C. The layout of said cam tracks is such that as the blank mold is opened, after the formation of a blank, the slide 106 and the rack 93 are raised, thereby reversing the neck ring carried by the transfer L from the blank mold to the blow mold, and when the blow mold is closed and the blank is deposited therein, shortly thereafter and before the corresponding blank mold is closed, the slide and rack are depressed reversing the transfer device back into its first position in the depression 104, and the blank mold is then closed over the neck ring. In case the transfer device, owing to disarrangement or being jammed as by spilled glass, refuses to operate, then the dog 107 becomes disengaged from the rack 93, thus preventing breakage of the mechanism.

111 is an open bottom cylinder bolted to the underside of the table E. 112 is a piston working in said cylinder attached to a plunger 113 which is adapted to be extended through a round hole 114 in mold table E coaxial with the blank mold. 115 is a passage in the material of the table connecting the upper end of the cylinder 111 with a pipe 116 which connects at its other end with the vertical port 117 in the table E under the block G. The arrangement of the ports 117 corresponding to the several blank molds is shown in Fig. 3.

M represents the blank mold cover plate, one of which plates is provided for each blank mold, and which carries the funnel by means of which the gather of glass is conducted, when sheared, into the open top of the blank mold and which also carries the plug with which the upper end of the blank mold is closed while the blank is being blown.

The plate M is attached at its ends to the arms 118 which extend radially from the vertically disposed hub 119 which is pinned to the upper end of shaft 120 which depends within a sleeve 121 whose upper end is split and provided with radial pierced ears 122 and clamping bolt 123 by means of which the shaft 120 and with it the cover plate M may be supported at any desired elevation relative to the sleeve 121. Said sleeve extends through a bearing block 124 bolted to the underside of the table E and extending up into a hole 125 in said table. The sleeve 121 is both rotatable and longitudinally slidable in said bearing block. The lower end of said sleeve is pinned in a socket 126 in a foot block 127. 128 is a pin extending horizontally from said foot block and having journaled on its protruding end a roller 129 which engages an annular cam track 130 mounted on the platform C and of varying levels in relation thereto. It is evident that as the table E revolves the travel of the rollers 129 along the track 130 will raise and lower the cover plates M.

131 is a second pin depending from the foot block 127 eccentric of the sleeve 121, and having journaled thereon a roller 132 which engages a channel cam track 133 mounted on the platform C and varying in its radial distance from the axis of the machine. The tracks 130 and 133 may be integral. It is therefore evident that as the rollers 132 travel around the track 133 the cover plates M will be swung back and forth with sleeves 120 as the axes.

On one side of its center each cover plate M is provided with a circular opening 134 which is circumferentially enlarged at its upper end, forming a seat for the interchangeable funnel 135 whose outer wall is shouldered to fit into said seat. The lower end of said seat is flared to fit down over the upper end of the closed blank mold with the funnel resting on the top of said mold, as shown in Fig. 17. On the other side of the center of the plate M, said plate is provided on its under side with a socket 136 in which fits the upper end of the interchangeable blank mold plug 137 which is secured in position by a screw bolt extending down through the plate M.

The arrangement of the mechanical parts is such that when a blank mold is closed the plate M is raised and swung so that the funnel 135 is positioned over the blank mold and the plate is then dropped until the funnel rests upon the mold, as shown in Fig. 17. As the roller 129 reaches the depression in track 130 which causes the funnel to seat on the mold, as shown in Fig. 14, it passes under a spring depressed cap track 138 which exerts a downward pressure on the roller 129 keeping it in snug engagement with the depression in the track 130 and insuring the proper seating of the plate M on the blank mold. The gather is now sheared off, as will hereafter be more fully described, and dropped through the funnel into the blank mold, as shown in Fig. 17, the plate M is now raised as shown in Fig. 18 and then swung so that the mold plug 137 is positioned over the open top of the blank mold and the plate is then depressed, causing the plug to enter and close the upper end of the blank mold, as shown in Fig. 19. In such case the roller 129, as it moves down into the depressed portion of the track 130 which results in seating the plug in the top of the blank mold, again passes under a spring cap track 138 to insure the roller following down into the track depression. When the blank is blown the cover plate M is raised out of the way so that when the blank mold is opened, the transfer L is free to swing to deposit the blank in the blow mold.

Each blow mold is provided with a blow head N, which is arranged to be swung down over the blow mold after the mold is closed and the blank is deposited therein, and which is shown as of the following construction. 139 is an annular cap piece adapted to fit down onto the top of the blow mold J. The interior of said cap is connected by an axial bore 140 with a bowl shaped depression 141 in the upper end of said cap. 142 is a plunger whose lower end is rounded to fit into the depression 141 in which it is loosely secured by means of clips 143 bolted to the top of said cap and projecting into a circumferential groove 144 cut in said plunger.

The upper end of said plunger is reduced in diameter. 145 is a differential sleeve which fits down over the upper end of said plunger, the protruding end of said plunger being pierced diametrically to receive a cotter pin 146 which prevents the plunger dropping out of said sleeve. 147 is a helical spring mounted between the internal shoulder of said sleeve and the circumferential shoulder of said plunger, thus resiliently depressing the plunger in the sleeve. It is thus seen that the mounting of the cap 139 on the lower end of the plunger is flexible and the plunger is spring depressed in relation to its mounting, thereby insuring a proper seating of the cap on the top of the blow mold when the blow head N is turned into its blowing position, as shown in Figs. 7 and 9. Said plunger is provided with a radial and threaded port 148 connecting with an axial bore 148ª which extends through the lower end of the plunger.

150 is an angular, bifurcated bracket integral with the sleeve 145, provided with alined hubs 151 which are journaled on the ends of a shaft 152 which is mounted intermediate of ends in the twin sleeves 153 integral with a plate 154 bolted on the table E by means of the bolts 38 upon which the blow mold plates K are hung in place. 155 is a cotter pin which extends through one of the sleeves 153, and the shaft 152 to prevent the latter from turning.

156 is a hub journaled on the shaft 152 between the sleeves 153 having integral therewith a radial stem 157 whose outer end is seated in a hole in the central web of the bracket 150. 158 is a helical spring coiled about said stem between its circumferential shoulder 159 and said bracket.

The shaft 152 is bored as at 160 from one end to its center where it is provided with a radial port 161 which connects the bore 160 with the bore of the hub 156. 162 is a passage leading from the interior of said hub 156 to a threaded port in the wall of the stem 157 which port is connected by a pipe 163 preferably coiled, with the radial port 148 in the plunger 142.

The bored end of the shaft 152 is connected by a pipe 164 with the proper port 165 extending up through the table E under the block G. The location of the ports 165 is shown in Fig. 3.

The port 161 in the shaft 152 is so positioned that when the blow head N is in the position shown in Fig. 7 for the blowing operation, communication is established between the pipe 164 and the blow head for the supply of blowing pressure to the mold J, but when the blow head is turned out of said position, such communication is interrupted.

The blow head is swung into the position shown in Figs. 7 and 9 for the blowing operation and then out of said position, out of the way of the opening mold parts for dumping the ware, so that the mold may be closed and the transfer may swing over to deposit the blank in the blow mold and then swing back toward the blank mold. The shaft 152 is the axis of the swing. Thus one of the hubs 151 is provided with a radial projection 166 to the outer end of which is pivotally connected the upper end of a depending link 167 which extends through a roller guide 168 mounted on the lower ends of adjacent bolts 38. The lower end of said link 167 is provided with a roller 169 which contacts with two spaced apart channel cam tracks 170 and 171, carried by table C and which vary in vertical level so that the first track 170 encountered by the roller 169 after the blow mold is closed raises said roller and turns the blow head N into the blowing portion shown in Fig. 7 while the other cam track 171 is encountered after the blowing operation is completed and lowers said roller so that the blow head is turned over on its back out of the way.

Referring now to Figs. 20, 21, and 22, it will be seen that the block G has cut into its under face four circumferentially elongated chambers 172, 173 and 174 arranged on the same circumferential line, and 175 between said line and the inner perimeter of the block G. The chambers 172, 173 and 174 are in the path of the ports 117 as the table E revolves, so that said ports in turn register with each of said chambers. Likewise the chamber 175 is in the path of the ports 165 in said table, said ports registering in turn with said chamber as the table revolves.

176 is a port extending down through the ring G to the chamber 174 and the upper end of said port is connected by a valved pipe 177 to a header pipe 178 which is connected by a valved pipe 179 with a tank or other constant supply of fluid pressure.

180 is a port extending down through the ring G to the chamber 173 and connected by a pipe 181 to the outlet of a spring seated check valve 182 mounted on the member H and having its protruding stem engaged by a pivoted finger 183 which is in the path of the annular series of vertical posts 184 carried by the table E, and equal in number to the blank molds. 185 is a port leading down through the ring G to the chamber 172 and connected at its upper end by a pipe 186 to a suction pump or other source of vacuum. It is evident that while a port 117 is in registration with the chamber 173 and the valve 182 is temporarily opened by one of the posts 184, a short puff of compressed air will be introduced into the upper end of the corresponding cylinder 111. Again, during the time a port 117 is in registration with the chamber 174 a longer blank blowing blast of air will be admitted to the upper end of the corresponding cylinder 111. To enable me to adjust the length of such blank blowing blasts, I aline in the rear of said chamber 174 a plurality of vertical ports 187 through the ring G each connected by a valved pipe 188 with the header pipe 178. Said ports are close enough together and the first port near enough to the rear end of the chamber 174 that a table port 117 does not pass completely out of registration with the chamber 174 or with one of said ports 187 before it begins to come into registration with the next port 187. Thus by opening the valves of one or more of the pipes 188, I in effect lengthen the chamber 174 and prolong the blowing blast. I am thus able to blow larger or smaller blanks in accordance with the size of the blank molds. The chamber 172 is so positioned in the ring G that when a gather of molten glass is dropped down into a blank mold, suction is applied to the top of the corresponding cylinder 111 to suck the glass down into and fill the neck ring and also to raise the piston so that the plunger will dimple the glass in the neck ring to form a blowing cavity. The chamber 173 and the check valve 182 are so located that as soon as the glass is filled into the neck ring, a short puff of air is admitted to the upper end of the cylinder 111 to depress the piston and disengage the plunger from the glass. The chamber 174 is so located that after the gather in said blank mold has had time to properly reheat, the corresponding port 117 registers with the chamber 174, thus maintaining a blank blowing blast into the top of the cylinder and up through the hole 114 to blow the blank to form. The action of the cover plate M is so timed that when the gather is dropped, the funnel 135 is positioned on the open top of the blank mold and before the blank blowing blast is applied from chamber 174 the plug 137 has closed the upper end of the blank mold.

The chamber 175 is connected to the top of the block G by a port 189 which is connected by a valved pipe 190 with a header pipe 191 which is connected in turn by a valved pipe 192 with the fluid pressure supply pipe 179. The effective length of the chamber 175 is likewise adjustable by the provision of a plurality of properly alined ports 193 connected by valved pipes 194 with the header 191. When a blank has been dropped into a closed blow mold, and the blow head N has been turned down onto said mold, the corresponding table port 165 comes into registry with the chamber 175 admitting a prolonged blast of compressed air into the top of the mold sufficient to blow the article to form in the blow mold. The length of said blast may be regulated by means of the ports 193 so that an article of either large or small size may be blown in accordance with the character of blow molds used.

The mechanism is assembled and the action of the various parts so timed that a transfer device L is in position when its blank mold closes, the cover plate M then swings and drops to seat the funnel on the top of the closed blank mold. The gather is then introduced into the mold through the funnel and is sucked down to fill the neck ring. The cover plate is then elevated, turned and then dropped to plug the top of the blank mold. Meanwhile a puff of air has been admitted to the cylinder 111 to drop the piston. The gather is now given a sufficient time to reheat and then the blowing blast is admitted to blow the blank to form. The cover plate is now raised, and the blank mold is then opened and the transfer L actuated to lift the blank out of the opened blank mold and drop it, other end up, into the blow mold as the latter completely closes. The transfer L is then reversed to its original position and the blank mold is again closed. Meanwhile the blow head N has been turned over onto the top of the blow mold and the corresponding port 167 comes into registration with the chamber 175 admitting the blowing blast into the blow mold. When the blowing operation is completed the blow head is reversed out of the way, the blowing mold is opened and its bottom tilted to discharge the blown ware. The bottom is then once more raised and held in position until the blowing mold is again closed.

In Fig. 2, I have indicated diagrammatically the operation of a machine provided with ten pairs of molds, the molds being indicated at ten locations around the machine by the letters I for the blank molds and J for the blow molds.

Thus at I' a blank mold is closed and the feed funnel depressed in engagement with its top and the transfer mechanism turned inwardly with its neck ring under the blank mold, as shown in Fig. 1. The gather is sheared and drops down into the mold and is sucked down to fill the neck ring by the vacuum applied from chamber 172 just before the gather is deposited and continued for sufficient period to compact the gather in the mold. The suction also raises the piston in the cylinder 111 causing the plunger to dimple the molten glass in the neck mold. As the blank mold passes position $I^2$, a puff of air from chamber 173 is applied depressing the piston and plunger.

As the blank mold approaches position $I^2$, the cover plate is raised elevating the funnel from the mold and the plate is turned and as the blank mold passes beyond the position $I^2$ the cover plate is depressed seating the plug in the upper end of the blank mold.

The blank reheats during the passage from $I^2$ to $I^3$.

As the blank mold passes the position $I^3$ the blowing pressure is applied to the bottom of the blank mold from the chamber 174 and is continued for the necessary length of time to properly blow the blank, the effective length of said chamber being adjusted as already described. The blowing however should cease as the blank mold passes $I^4$. The plug is raised out of the mold when the blowing operation ceases, elevating the cover plate out of the way. The blank mold opens between the positions $I^4$ and $I^5$ and between the positions $I^5$ and $I^6$ the transfer mechanism operates to transport the blank from the blank mold to the blow mold, the blank being deposited in the reverse position from that in which it was formed. Between the positions $I^6$ and $I^7$ of the blank mold the blow mold is closed about the blank releasing the blank from the neck ring. Between the positions $I^7$ and $I^8$ the transfer device is swung back into position with its neck ring closed and seated in depression 104 in the table E. Between the positions $I^8$ and $I^9$ the blank mold is closed and between the positions $I^9$ and $I^{10}$ the cover plate is turned and depressed to fit the funnel on top of the blank mold, ready for the feed at I'.

As already indicated at the position $J^6$ which corresponds to position $I^6$ of the blank mold, the transfer mechanism inserts the blank down into the blow mold, the bottom of the mold having been raised by the cam track 75 and between the positions $J^6$ and $J^7$ the blow mold closes about the blank, opening the neck ring of the transfer and releasing the blank. Between the positions $J^7$ and $J^8$ the transfer mechanism L is reversed out of the way and the blowing mechanism N is turned down over the blow mold with the head fitting into the top of the mold and blowing air is applied from the chamber 175 where effective length to produce a blow of the required duration to form the ware being made, is adjusted as already described.

By the time when the blow mold passes the position $J^{10}$ the blowing ceases and the blow ware remains in the closed blow mold until the blow mold approaches the position $J^5$ when the mold begins to open and between the positions $J^5$ and $J^6$ the mold is fully opened, the bottom is dropped by the retraction 76 of the cam track 75 to discharge the ware, and is then raised into position as the mold approaches the position $J^6$ where, as already described, the transfer mechanism removes the blank from the blank mold to the blow mold.

In Fig. 23, I show the automatic feed which I prefer to use with the machine. O represents the boot of a glass tank or furnace having an open discharge port 194 which is above the path of the blank molds as they pass the station I'. P represents a shear cylinder operating the shear blades 195 which work beneath the port 194 to shear off the glass at proper intervals as a blank mold with its funnel in place registers therewith. The cutting action of the shears is induced by fluid pressure introduced into the rear end of the cylinder through a fluid pressure pipe 196 which has interposed therein a spring closed check valve 197 mounted on the cam support H and having its protruding stem 198 provided with a rounded head and extending into the path of the posts 184 on the table E whereby when a blank mold passes under the port 194 the depending glass is cut off and drops through the funnel into the blank mold. Owing to the rapidity of the action of the machine, no means for halting or interrupting the flow of the glass through the port 194, other than the shear blades need be provided and the shear scar is eliminated before the blank is blown by allowing the gather to first reheat in the blank mold.

Although, for the purpose of clearness, I have minutely described the embodiment of the principles of my invention shown in the drawings, I do not wish to limit myself thereby, but claim broadly.

1. In a machine for forming articles of glass, the combination of a movable mold support, a blow mold mounted on said support, a blow head mounted on said support and adapted to be brought, by the movement of said support, into blowing engagement with the mold for the application of blowing pressure, and means for regulating the duration of such application.

2. In a machine for forming articles of glass, the combination of a circular series of open ended blank molds adapted to receive charges of glass dropped from above, a circular series of neck molds, one for each blank mold adapted to be associated with its blank mold during the shaping of the blanks therein, a circular series of blow molds, a rotatable support for the blow molds, means for continuously rotating said series of blank, neck and blow molds in synchronism, means for disengaging the blank molds from the blanks to support the blanks by the neck molds, means for closing the blow molds around the thus supported blanks and releasing the neck molds therefrom to transfer the blanks to the blow molds, a blow head associated with each of said blow molds, cam means for moving the blow heads into blowing engagement with the blow molds by the movement of said support carrying the blow molds, for the application of blowing pressure, and means for regulating the duration of such application.

3. In a machine for forming articles of glass, the combination of a circular series of separable blank molds adapted to receive charges of glass dropped from above, a circular series of neck molds, one for each blank mold adapted to be associated with its blank mold during the shaping of the blanks therein, a circular series of separable blow molds, a rotatable support for the blow molds, means for continuously rotating said series of blank, neck and blow molds in synchronism, means for disengaging the blank molds from the blanks to support the blanks by the neck molds, means for closing the blow molds around the thus supported blanks and releasing the neck molds therefrom to transfer the blanks to the blow molds, a blow head associated with each of the blow molds, cam means for successively swinging the blow heads into blowing engagement with their respective blow molds by the movement of said support carrying the blow molds, for the application of blowing pressure, and means for regulating the duration of such application.

4. In a machine for forming articles of glass, the combination of a circular series of separable blank molds, a circular series of separable blow molds, a rotatable support for the blow molds, means for rotating the series of blank molds and blow molds, a circular series of separable neck molds for supporting the blanks during transfer from the blank molds to the blow molds, means for opening and closing the blow molds, means for opening the neck molds just prior to the complete closing of the blow molds, a blow head associated with each of the blow molds, said blow heads being successively brought, by movement of said support for the blow molds, into blowing engagement with their respective blow molds for the application of blowing pressure, and means for regulating the duration of such application.

5. In a machine for forming articles of glass, the combination of a moving mold table a blank mold and a finishing mold associated together on said table, forming means associated with said blank mold, pivotally mounted forming means associated with said finishing mold, pivotally mounted means for transferring the blanks from the blank mold to the finishing mold, the paths of movement of said second named forming means and of said transfer means intersecting, and means for swinging said second named forming means to one side to provide clearance for the operation of said transfer means, said second named forming means and said transfer means being actuated in proper sequence by the movement of said mold table.

6. In a machine for forming articles of glass, the combination of a rotary mold table, a blank mold and a finishing mold associated together on said table forming means associated with said blank mold, forming means associated with said finishing mold and pivotally mounted on said table to swing in a plane substantially tangential to the arc of movement of said table, means for transferring the blanks from the blank mold to the finishing mold, said means being pivotally mounted on said table to swing in a plane substantially radial to the axis of said table, and means for shifting said second named forming means to provide clearance for the operation of said transfer means, all of said means being actuated in proper sequence by the movement of said table.

7. In a machine for forming articles of glass, the combination of a rotary mold table, a plurality of pairs of molds mounted on said table, each pair comprising a blank mold and a finishing mold, transfer means for each pair of molds and pivotally mounted on said support to swing in a plane substantially radial to the axis of the table, forming means for the blank molds, and forming means for each finishing mold and pivotally mounted on said table to swing in a plane substantially tangential to the arc of movement of said table.

8. In a machine for forming articles of glass, the combination of a rotary mold table, a plurality of pairs of molds mounted on said table, each pair comprising a blank mold and a finishing mold, transfer means for each pair of molds and pivotally mounted on said support to swing in a plane substantially radial to the axis of the table, forming means for the blank molds, forming means for each finishing mold and pivotally mounted on said table to swing in a plane substantially tangential to the arc of movement of said table, and means whereby all of said above mentioned means are actuated in proper sequence by the movement of said table.

9. In a machine for forming articles of glass, the combination of a rotary mold table, a plurality of pairs of partible molds mounted on said table, each pair comprising a blank mold and a finishing mold, means for opening and closing said molds, forming means associated with said blank molds, forming means associated with each of said finishing molds, said last named forming means being pivotally mounted on said table to swing on horizontal axes, and transfer means for each pair of molds for transferring the blanks from the blank mold to the finishing mold, said transfer means being pivotally mounted on said table to swing in planes substantially radial to the axis of said table.

10. In a machine for forming articles of glass, the combination of a rotary mold table, a plurality of pairs of partible molds mounted on said table, each pair comprising a blank mold and a finishing mold, means for opening and closing said molds, forming means associated with said blank molds, forming means associated with each of said finishing molds, said last named forming means being pivotally mounted on said table to swing on horizontal axes, transfer means for each pair of molds for transferring the blanks from the blank mold to the finishing mold, said transfer means being pivotally mounted on said table to swing in a plane substantially radial to the axis of said table, and means whereby all of the above mentioned means are actuated in turn by the movement of said table.

11. In a machine for forming articles of glass, the combination of a movable support, a mold mounted on said support, a blow head associated with said mold and mounted on a horizontal axis to swing into and out of engagement with said mold, a member depending from said blow head, and fixed cam means adapted to be engaged by said member as said support moves whereby said blow head is swung into and out of engagement with said mold by the movement of the support.

12. In a machine for forming articles of glass, the combination of a movable support, a mold mounted on said support, a blowing member pivotally mounted on said support on a horizontal axis intermediate of its ends, a blow head on the front end of said member adapted to engage the top of said mold, a depending member pivotally connected to the rear end of said blowing member, and fixed cam means adapted to engage the lower end of said depending member as the support moves whereby the movement of said support causes said blow head to be swung into and out of engagement with said mold.

13. In a machine for forming articles of glass, the combination of a rotary table, a plurality of pairs of molds mounted on said table, each pair comprising a blank mold and a finishing mold alined radially to the axis of the table, a transfer device for each pair of molds, said device being pivoted on said table to swing on a horizontal axis, fixed cam means beneath said table, and means connected to said device and depending below said table to be engaged by said cam means, whereby the movement of said table causes said transfer device to operate between said molds.

14. In a machine for forming articles of glass, the combination of a rotary table, a plurality of pairs of molds mounted on said table, each pair comprising a blank mold and a finishing mold alined radially of the table, a transfer device for each pair of molds, said device being pivoted on said table to swing on a horizontal axis, a gear wheel axially connected with said transfer device, a vertically disposed rack bar slidably carried by said table and meshing with said gear wheel, and fixed cam mechanism beneath said table adapted to reciprocate said rack bar as the table rotates.

15. In a machine for forming articles of glass, the combination of a rotary table, a plurality of pairs of molds mounted on said table, each pair comprising a blank mold and a finishing mold alined radially of the table, a transfer device for each pair of molds, said device being pivoted on said table to swing on a horizontal axis, a gear wheel axially connected with said transfer device, a vertically disposed rack bar slidably carried by said table, fixed cam means beneath said table adapted to reciprocate said rack bar as the table rotates, and means whereby when the transfer device abnormally resists movement it is automatically disengaged from said cam means.

16. In a machine for forming articles of glass, a movable support, a blank mold and a partible finishing mold associated together on said support, means for opening and closing said finishing mold, a transfer device working between said molds, and means whereby the closing of said finishing mold releases the blank from said transfer device.

17. In a machine for forming articles of glass, a movable support, a blank mold and a partible finishing mold associated together on said support, means operated by the movement of said support for opening and closing said finishing mold, a transfer device between said molds, said transfer device being operated by the movement of said support and comprising a pair of pivoted together blank engaging arms, and means whereby the closing of the finishing mold spreads said arms to release the blank and permit it to drop into the finishing mold.

18. In a machine for forming articles of glass, the combination of a blank mold having its upper end open to receive a gather of glass, and vacuum operated means coacting with the lower end of said mold for compacting the glass therein and for dimpling the glass preparatory to blowing the blank.

19. In a machine for forming articles of glass, the combination of a blank mold having its upper end open to receive a gather of glass, a plunger mounted beneath said mold, means for applying vacuum to the lower end of said mold to compact the glass therein, and means whereby the application of said vacuum elevates said plunger and dimples the glass preparatory to blowing the blank.

20. In a machine for forming articles of glass, the combination of a blank mold having its upper end open to receive a gather of glass, a neck ring registering with the lower end of said mold, and vacuum operated means coacting with said neck ring for compacting the glass therein and for dimpling the glass preparatory to blowing the blank.

21. In a machine for forming articles of glass, the combination of a blank mold adapted to receive a gather of glass, through its upper end, a neck ring registering with the lower end of said mold, a plunger mounted beneath said neck ring, means for applying vacuum to said neck ring to compact the glass therein, and means whereby said application of vacuum elevates the plunger and dimples the glass preparatory to blowing the blank.

22. In a machine for forming articles of glass, the combination of a blank mold adapted to receive a gather of glass through its upper end, a plunger movable in axial alinement with the lower end of said mold, means for applying vacuum to the lower end of said mold to compact the glass therein, means whereby the said application of vacuum raises said plunger to dimple the glass preparatory to blowing the parison, means for applying pressure to the lower end of said blank mold to blow the blank, and means whereby the said application of pressure depresses said plunger to permit said blowing.

23. In a machine for forming articles of glass, the combination of a blank mold adapted to receive a gather of glass through its upper end, a neck ring registering with the lower end of said mold, a plunger movable in axial alinement with said neck ring, means for applying vacuum to the lower end of said neck ring to compact the glass therein; means whereby the said application of vacuum elevates said plunger to dimple the glass preparatory to blowing the blank, means for applying pressure to said neck ring to blow the parison, and means whereby the said application of pressure depresses said plunger to permit said blowing.

24. In a machine for forming articles of glass, the combination of a blank mold adapted to receive a gather of glass through its upper end, a plunger associated with the lower end of said mold, means for applying suction to said plunger to elevate it to dimple the lower end of the gather, means for applying fluid pressure to said plunger to retract it from the gather, and means for applying blowing pressure to the bottom end of said mold to complete the parison.

25. In a machine for forming articles of glass, the combination of a blank mold adapted to receive a gather of glass through its upper end, a plunger associated with the lower end of said mold, means for applying suction to said plunger to elevate it to dimple the lower end of the gather, means for applying fluid pressure to said plunger to retract it from the gather, means for applying blowing pressure to the bottom of said mold to complete the parison, and means for regulating the moment of application of said blowing pressure.

26. In a machine for forming articles of glass, the combination of a blank mold adapted to receive a gather of glass through its upper end, a plunger associated with the lower end of said mold, means for applying suction to said plunger to elevate it to dimple the lower end of the gather, means for applying fluid pressure to said plunger to retract it from the gather, means for applying blowing pressure to the bottom of said mold to complete the parison, and means for regulating the duration of the application of said blowing pressure.

27. In a machine for forming articles of glass, the combination of a blank mold adapted to receive a gather of glass through its upper end, a plunger associated with the lower end of said mold, means for applying suction to said plunger to elevate it to dimple the lower end of the gather, means for applying a puff of compressed air to said plunger to retract the same from the gather, and means for admitting fluid pressure to the lower end of said mold to complete the parison.

28. In a machine for forming articles of glass, a movable support, a blank mold and a partible finishing mold associated together on said support, means for opening and closing said finishing mold, a transfer device working between said molds, said transfer device being provided with a pair of coacting parison gripping portions, means whereby the closing of the finishing mold spreads said parison gripping portions, and means for regulating the degree to which said portions are so spread apart.

29. In a machine for forming articles of glass, a movable support, a blank mold and a partible finishing mold associated together on said support, means for opening and closing said finishing mold, a transfer device working between said molds, said transfer device being provided with a pair of coacting parison gripping portions, means whereby the closing of the finishing mold spreads said parison gripping portions, and adjustable means for regulating the degree to which said portions are so spread.

30. In a machine for forming articles of glass, a movable mold support, a partible mold mounted on said support, a separate bottom for said mold, a carrier upon which said mold bottom is mounted, said carrier being swingingly mounted on said support so as to raise and lower said mold bottom, cam mechanism, a member swingingly mounted on said support and axially alined with said carrier, said member being adapted to be engaged by said cam mechanism as said support moves, and a spring clutch connection between said carrier and said member whereby said mold bottom is raised and lowered by the movement of said support, but in case said mold bottom abnormally resists movement said clutch is disengaged.

31. In a machine for forming articles of glass, a movable mold support, a partible mold mounted on said support, a separate bottom for said mold, a horizontally disposed shaft on said support, a carrier upon which said mold bottom is mounted, said carrier being mounted to swing on said shaft, a member mounted to swing on said shaft, cam mechanism adapted to be engaged by said member as the support moves to swing said member, and a spring clutch connection between said carrier and said member whereby the movement of said support raises and lowers said mold bottom when the mold is open but in case said mold bottom abnormally resists movement said spring clutch becomes disengaged.

32. In a machine for forming articles of glass, the combination of a movable mold support, a partible mold mounted on said support, means actuated by the movement of said support for opening and closing said mold, a drop bottom for said mold, said bottom being held in its elevated position to close the bottom of said mold by engagement with the closed mold parts, a carrier upon which said mold bottom is mounted, said carrier being swingingly mounted on said support so as to raise said bottom into position to be engaged by the closing mold parts and to permit said bottom to drop when said mold is opened, cam mechanism, a member swingingly mounted on said support and adapted to be engaged by said cam mechanism as said support moves, and a spring clutch connection between said carrier and said member whereby said mold bottom is raised by the engagement of said member with said cam mechanism, but in case said mold bottom abnormally resists movement said spring clutch is disengaged.

33. In a machine for forming articles of glass, the combination of a movable mold support, a partible mold mounted on said support, a drop bottom for said mold, said bottom in its elevated position closing the said mold and dropping into its depressed position to discharge the ware, a carrier upon which said mold bottom is mounted, said carrier being mounted on said mold support to swing on a horizontal axis, a fixed cam mechanism, an arm mounted on said mold support to swing co-axially with said carrier, said arm being yieldingly connected to said carrier so that when said arm is engaged by said fixed cam, said drop bottom is raised into its operative position relative to said mold but in case said drop bottom abnormally resists movements said carrier will not move with said arm.

34. In a machine for forming articles of glass, the combination of a pair of molds comprising a blank mold and a finishing mold, a parison transfer device pivotally mounted on a horizontal axis so as to swing between said molds, one end of said mounting being hinged on a horizontal axis whereby said transfer device may be swung aside from between said molds to obtain clearance.

Signed at Pittsburgh, Pennsylvania, November, 1919.

WILLIAM J. MILLER.